United States Patent
Nguyen et al.

(10) Patent No.: US 8,332,414 B2
(45) Date of Patent: Dec. 11, 2012

(54) METHOD AND SYSTEM FOR PREFETCHING INTERNET CONTENT FOR VIDEO RECORDERS

(75) Inventors: Phuong Nguyen, San Jose, CA (US); Simon J. Gibbs, San Jose, CA (US); Anugeetha Kunjithapatham, Sunnyvale, CA (US); Priyang Rathod, Mountain View, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 463 days.

(21) Appl. No.: 12/166,265

(22) Filed: Jul. 1, 2008

(65) Prior Publication Data

US 2010/0005084 A1  Jan. 7, 2010

(51) Int. Cl.
*G06F 7/00* (2006.01)
*G06F 17/30* (2006.01)
*G06F 13/14* (2006.01)

(52) U.S. Cl. ......... 707/749; 707/705; 707/736; 707/748
(58) Field of Classification Search .................. 707/736, 707/999.003, 999.006, 999.01, 999.103, 707/999.002, 999.107, 999.201, 723, 749; 725/10–225; 715/10–53, 110–127
See application file for complete search history.

(56) References Cited

U.S. PATENT DOCUMENTS

| | | | |
|---|---|---|---|
| 5,835,667 A | 11/1998 | Wactlar et al. | |
| 6,334,127 B1 | 12/2001 | Bieganski et al. | |
| 6,438,579 B1 | 8/2002 | Hosken | |
| 6,463,433 B1 | 10/2002 | Baclawski | |
| 7,162,473 B2 | 1/2007 | Dumais et al. | |
| 7,228,556 B2 | 6/2007 | Beach et al. | |
| 2003/0126600 A1* | 7/2003 | Heuvelman | 725/35 |
| 2003/0164844 A1 | 9/2003 | Kravitz et al. | |
| 2003/0177495 A1* | 9/2003 | Needham et al. | 725/55 |
| 2004/0117831 A1* | 6/2004 | Ellis et al. | 725/53 |
| 2005/0120391 A1 | 6/2005 | Haynie et al. | |
| 2006/0056800 A1 | 3/2006 | Shimagami et al. | |
| 2007/0027844 A1 | 2/2007 | Toub et al. | |
| 2007/0214488 A1 | 9/2007 | Nguyen et al. | |
| 2009/0077195 A1 | 3/2009 | Gibbs et al. | |

FOREIGN PATENT DOCUMENTS

| | | |
|---|---|---|
| KR | 2002006810 | 1/2002 |
| KR | 20020005147 | 1/2002 |
| KR | 20040052339 | 6/2004 |

(Continued)

OTHER PUBLICATIONS

Notification of Transmittal of the International Search Report and the Written Opinion of the International Searching Authority for International Application No. PCT/KR2008/001558, dated Jun. 26, 2008, 5 pages.

(Continued)

*Primary Examiner* — Greta Robinson
*Assistant Examiner* — Cecile Vo
(74) *Attorney, Agent, or Firm* — Beyer Law Group LLP

(57) ABSTRACT

A method and system for providing information related to content accessed by a user of an electronic device is provided. An implementation involves determining content of interest to the user for access via an electronic device; obtaining metadata for said content; prefetching information related to said metadata; upon detecting availability of further metadata for said content, prefetching additional information related to said further metadata; and upon access to the content by the user via the electronic device, selectively providing the prefetched information to the user.

17 Claims, 4 Drawing Sheets

FOREIGN PATENT DOCUMENTS

| KR | 20060027226 | 3/2006 |
|---|---|---|
| WO | 0137465 | 5/2001 |
| WO | 0243310 | 5/2002 |
| WO | 2005055196 | 6/2005 |
| WO | 2007004110 | 1/2007 |

OTHER PUBLICATIONS

Livingston, K. et al., "Beyond Broadcast," 8th International Conference on Intelligent User Interfaces, Jan. 2003, pp. 260-262, Association for Computing Machinery, New York, NY, United States.

Zhuang, Y. et al., "Applying semantic association to support content-based video retrieval," Oct. 1998, International workshop on Very Low Bitrate Video Coding (VLBV 1998), pp. 1-4, United States.

Yahoo Search Engine, http://search.yahoo.com, downloaded on Sep. 19, 2008, p. 1, United States.

Wachman, J. et al., "Tools for Browsing a TV Situation Comedy Based on Content Specific Attributes," Mar. 2001, Multimedia Tools and Applications, vol. 13 No. 3, pp. 1-32, Kluwer Academic Publishers, Boston, United States.

Tjondronegoro, D. et al., "Extensible detection and indexing of highlight events in broadcasted sports video," Jan. 2006, Proceedings of the 29th Australasian Computer Science Conference, pp. 237-246, Hobart, Australia.

Spalti, M., "Finding and Managing Web Content with Copernic 2000", Sep. 2000, Library Computing, Westport, pp. 217-221, vol. 18, No. 3, United States.

Rau, L.F. et al., "Domain-independent summarization of news," Jun. 1994, in Summarizing Text for Intelligent Communication, pp. 71-75, Dagstuhl, Germany.

Opera Software ASA, Opera Browser for Devices, http://www.opera.com/products/devices/, downloaded Sep. 19, 2008, pp. 1-2, United States.

Microsoft Corporation, MSN TV, http://www.webtv.com/pc, downloaded Sep. 19, 2008, p. 1, United States.

Microsoft Corporation, Microsoft Windows Media Player, http://www.microsoft.com/windows/windowsmedia/, Sep. 19, 2008, p. 1, United States.

Livingston, K. et al., "Beyond broadcast: a demo," Jan. 2003, In Proceedings of the 8th International Conference on Intelligent User Interfaces, ACM Press, New York, NY, pp. 325-325, United States.

Henzinger, M. et al., "Query-free news search," May 2003, Proceedings on the 12th International Conference on World Wide Web, ACM Press, New York, NY, pp. 1-10, United States.

Google Inc., Google Desktop Search, http://desktop.google.com, downloaded Sep. 19, 2008, p. 1, United States.

Google Inc., Google Search Engine, http://www.google.com, downloaded Sep. 19, 2008, p. 1, United States.

Brill, E., "A simple rule-based part of speech tagger", Mar. 1992, Proceedings of the Third Conference on Applied Natural Language Processing, pp. 152-155, United States.

Babaguchi, N. et al., "Intermodal collaboration: A strategy for semantic content analysis for broadcasted sports video", Sep. 2003, pp. 13-16, United States.

Apple Inc., Apple iTunes, http://www.apple.com/itunes/, Apr. 28, 2003, pp. 1-2, United States.

Notification of Transmittal of the International Search Report and the Written Opinion of the International Searching Authority, dated Aug. 20, 2008; International Search Report and Written Opinion of the International Searching Authority for International Application No. PCT/KR2008/001941, 9 pages.

Notification of Transmittal of the International Search Report and the Written Opinion of the International Search Authority Application No. PCT/KR2008/000537 dated May 15, 2008, 11 pages.

Sen, S. et al., "Proxy Prefix Caching for Multimedia Streams," IEEE Proceedings INFOCOM 1999 18th Annual Joint Conference of the IEEE Computer and Communications Societies, Mar. 1999, pp. 1310-1319, vol. 3, IEEE Computer and Communications Societies Press, New York, NY, USA.

El-Saddik, A. et al., "Exploiting User Behaviour in Prefetching WWW Documents," Proceedings of 5th International Workshop on Interactive Distributed Multimedia Systems and Telecommunication Service, 1998, pp. 302-311, vol. 1483 of Lecture Notes in Computer Science, Springer-Verlag, Berlin, Germany.

U.S. Non-final Office Action for U.S. Appl. No. 11/713,370 mailed Oct. 22, 2009.

U.S. Final Office Action for U.S. Appl. No. 11/713,370 mailed Apr. 14, 2010.

* cited by examiner

METHOD AND SYSTEM FOR PREFETCHING INTERNET CONTENT FOR VIDEO RECORDERS

FIELD OF THE INVENTION

The present invention relates to video recording and playback and in particular, to video recording with related video suggestion lists on personal video recorder (PVR) devices.

BACKGROUND OF THE INVENTION

Video recording and playback devices have been developed on many Personal Video Recorder (PVR) set top boxes. PVRs cannot search for any video streams in a database (e.g., local content, databases in the Internet, etc.) that are related to a currently watched program. PVRs can only record video streams, without the ability to record related information. Further, PVRs cannot suggest any pre-recorded video stream that is related to a currently viewed video stream. Further, PVRs do not allow viewing Internet content related to a TV program seamlessly. Internet content viewing relies on the Internet Protocol (IP) which is sensitive to packet loss and delays from various high traffic web servers.

BRIEF SUMMARY OF THE INVENTION

The present invention provides a method and system for providing information related to content accessed by a user of an electronic device. One embodiment involves determining content of interest to the user for access via an electronic device; obtaining metadata for said content; prefetching information related to said metadata; upon detecting availability of further metadata for said content, prefetching additional information related to said further metadata; and upon access to the content by the user via the electronic device, selectively providing the prefetched information to the user. Determining content of interest to the user may include determining content selected by the user to be recorded on a personal video recorder (PVR). Obtaining metadata for said content may include obtaining electronic program guide information for the selected content. Prefetching information related to said metadata may include prefetching information related to the electronic program guide information for the selected content, from external and/or local sources, electronic program guide information for the selected content. Prefetching additional information may further include, upon detecting availability of closed caption information for the selected content, prefetching additional information related to the closed caption information. Prefetching information may further include, upon access to the selected content on the PVR by the user, selectively displaying the prefetched information to the user. Prefetching information may further include providing the prefetched information to the user essentially at the same time as user access to the said content, thereby reducing latency in providing related information to the user.

These and other features, aspects and advantages of the present invention will become understood with reference to the following description, appended claims and accompanying figures.

DETAILED DESCRIPTION OF THE INVENTION

Figure 1:
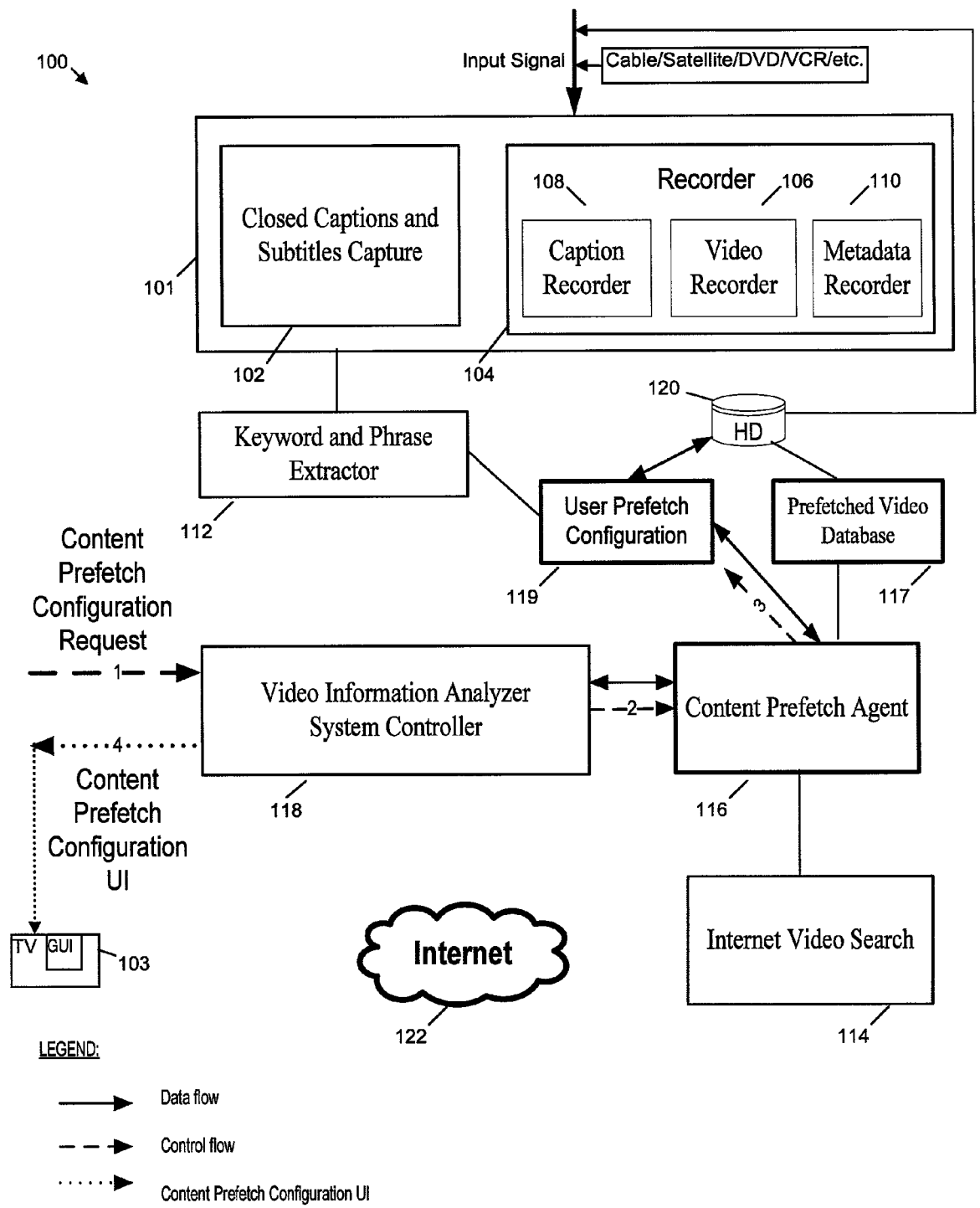
FIG. 1 shows a functional block diagram of a system for prefetching internet content for video recorders, according to an embodiment of the invention.

The present invention provides a method and system for providing information related to content accessed by a user of an electronic device. One embodiment involves determining content of interest to the user for access via an electronic device; obtaining metadata for said content; prefetching information related to said metadata; upon detecting availability of further metadata for said content, prefetching additional information related to said further metadata; and upon access to the content by the user via the electronic device, selectively providing the prefetched information to the user.

Determining content of interest to the user may include determining content selected by the user to be recorded on a personal video recorder (PVR). Obtaining metadata for said content may include obtaining electronic program guide information for the selected content. Prefetching information related to said metadata may include prefetching information related to the electronic program guide information for the selected content, from external and/or local sources, electronic program guide information for the selected content. Prefetching additional information may further include, upon detecting availability of closed caption information for the selected content, prefetching additional information related to the closed caption information. Prefetching information may further include, upon access to the selected content on the PVR by the user, selectively displaying the prefetched information to the user. Prefetching information may further include providing the prefetched information to the user essentially; at the same time as the user access to the said content, thereby reducing latency in providing related information to the user.

One implementation employs a client side approach of prefetching contents that are related to recorded audio/visual (A/V) programming (e.g., TV/cable program) being recorded. In one example, the client side represents an electronic device receiving A/V programming. A list of Internet content is compiled based on metadata for the programming, such metadata including one or more of: Electronic Program Guide (EPG) of a PVR system, Event Information Table (EIT), Advanced Television Systems Committee—Program and System Information Protocol (ATSC—PSIP), closed captioning (CC) embedded in the programming.

The client side approach does not require changes to network topography for implementation. In the example described below, metadata (e.g., EPG, subtitle, CC data) for TV/cable programming are used to select related internet content to be downloaded. The metadata is obtained from user scheduled recordings of TV/cable programming, leading to selection and download of Internet content such (e.g. videos) that are related to the TV/cable programming. The selected Internet content that is related to said TV/cable programming of interest to the user, is referred to as related internet content herein (the related internet content is of potential interest to the user). The download involves prefetching the related internet content to local storage at the client side. The prefetched content is displayed to the user from the local storage. Further, prefetch storage configuration is provided to enable the user to configure the local storage size for different interests and related internet content.

FIG. 1 shows a functional block diagram of a system 100 implementing a method for prefetching related internet content for a PVR 101, according to an embodiment of the invention. The system 100 includes a Closed Captions and Subtitles Capture module 102 that captures information (e.g., CC/subtitles) of a video stream in an Input Signal for a programming (e.g., video stream, TV channel on a selected channel, etc.) being recorded. The Input Signal can be from storage, cable, satellite, or other sources of video information. In one example, the module 102 is configured for capturing the CC of the programming. A text capturing process supports captioning standards to capture closed captions or subtitles from both analog and digital signals of the programming. Real-time closed caption text is saved continuously in a ring buffer for immediate analysis upon request. The ring buffer is preferably refreshed per any context changes, such as channel change, program change, etc.

The system 100 further includes a Recorder module 104 that comprises a Video Recorder 106, a Caption Recorder 108, and a Metadata Recorder 110. The Video Recorder 106 records a requested video stream onto a storage module 120 (e.g., disk drive, memory, etc.). In one example, the Video Recorder 106 includes a hardware MPEG encoder chip for video encoding to a format that the PVR 101 can playback.

The Caption Recorder 108 selectively records the text captured from the CC or subtitles in the incoming video stream of the Input Signal. The Caption Recorder 108 receives retrieved information from the module 102 for recording. The Caption Recorder 108 also receives information extracted by a Keyword and Phrase Extractor module 112 (described further below) for recording. Recording such information enables local video searching for compiling internet search queries or a related video suggestion list from the Internet for the user/viewer.

The Metadata Recorder 110 records metadata for the input video stream. In one example, such metadata includes information related to the video stream (e.g., from Electronic Program Guide (EPG), or either from the EIT in the ATSC—PSIP or from third party "metadata aggregators" such as Tribune TV Data or Gemstar TV Guide). This related information should include, but is not limited to, the video stream/channel name, its description, its types/genres, its length, its series, etc. The Recorder associates the related metadata with the recorded stream. Associating the video stream and its metadata may involve providing each video stream recording request with a unique directory in which recorded video stream and its metadata (e.g., closed captions, EPG information), reside as identifiable files.

The system 100 further includes a Keyword and Phrase Extractor module 112 that responds to user requests received via the Controller module 118, and accesses text buffered in the Closed Captions and Subtitles Capture module 102 to extract keywords and phrases related to the user request. Per request, the module 112 accesses the buffered text in the Closed Caption Capture component 102 to extract keywords and phrases. A user request can be based on the information in the EPG or other relevant information (metadata) for the programming being recorded. For keyword extraction by the module 112, information of potential interest to the viewer is determined by monitoring viewer interactions with the TV 103 or the PVR 101. Important words and phrases from the closed captions are identified as keywords. For example, when the user is watching/recording TV programming, it is likely that the viewer is interested in the content of the TV programming. The content of the TV programming is determined by analyzing metadata such as text of CC for that TV programming. Further, context can be gathered from the information about the channel being watched. Such information can be combined to make recommendations for potential topics of interest to the user.

For example, if the user is watching news coverage involving Baltimore, the word "Baltimore" is extracted by the module 112 as a keyword. This is achieved by transforming corresponding closed captions (and/or subtitles) into text (using well-known transformation methods). Then, stop words in the text are removed. Stop words are words like "of", "on", "the" etc., which have no meaning by themselves. Then, the words in the remaining text, and their frequency occurrence, are recorded. The record of words are reset as soon as the channel is changed or a topic change is discovered using special characters in the text obtained from the closed captions. The text can sometimes contain case information. For example, proper nouns start with uppercase letters. On other occasions, the text is case insensitive. When case information is absent, proper nouns are obtained by comparing each word against words in a dictionary that includes words that are not proper nouns. If a word under consideration is not present in the dictionary then it is assumed to be a proper noun. Proper nouns convey useful contextual information as they refer to specific names of people, places or things. Words identified as proper nouns are therefore tagged.

When case information is present, proper nouns are detected based on the case of the first character of each word. Proper nouns are tagged so that they can be detected later. At any given instant, words identified within an n second window (i.e., words received within an n second period of time, which may be the last n seconds) and their frequencies and proper noun related information are maintained. For example, an n=10 second window means that the words were gathered in the past 10 seconds. The frequency of all words is used to extract words (i.e., keywords) of interest from all words gathered from the past n seconds, for the user. For example, when the user activates a specific button on e.g. a GUI and/or a TV remote control, for a user request (e.g., action by a user such as clicking on a button), the words in the last n seconds are set-aside as the words of most importance. The frequency of each of the words set-aside is checked and each word is ranked based on its frequency. A rank is assigned to each word proportional to its frequency. Each word is also checked to determine if it is a proper noun, using the tag generated above. A ranked list is produced where high frequency words and proper nouns occupy the top of the list. The top i words from the ranked list along with proper nouns and high-frequency words identified since the start of the TV program capture the context of what the user is watching, as keywords. Words captured in the n second window, capture the context at a fine level of detail; whereas the proper nouns and high frequency words captured since the start of the program, capture the context at a higher level. Other examples of identifying important keywords and phrases from the CC are possible and contemplated by the present invention. For example, Natural Language Processing techniques can be used for part-of-speech analysis. Other examples of keyword extraction can be implemented. The module 112 performs metadata extraction (e.g., using similar steps) to extract keywords and phrases from metadata associated with the currently watched program.

The system 100 further includes an Internet Video Search module 114 that handles internet search for related internet content. Search queries applied to this module are formed with keywords and phrases extracted from the metadata of the currently viewed/recorded programming. The Internet Video Search module 114 processes Internet search queries for information (e.g., video) related to the programming. The queries include keywords and phrases extracted from the metadata of the program. The Internet Video Search module 114 accesses search engines on the Internet 122 to perform the search and acquire results. Each search engine may have a different set of application programming interfaces (APIs) for web search capabilities. Preferably the Internet Video Search module 114 supports access to essentially all manor search engines and provide plug-in mechanisms for extending to new search engines.

The system 100 further includes a Content Prefetch Agent 116 that is alerted by the system Controller 118 to pre-fetch related internet content specified by a user Prefetch Configuration 119. To begin a pre-fetch task from the system Controller 118, the Control Prefetch Agent 116 first accesses the EPG information of the TV programming being recorded. This EPG information is available from the basic PVR subsystems. The Content Prefetch Agent 116 then continually obtains keyword lists from the Keyword and Phrase Extractor 112. With the information from the EPG and keywords, as new keyword lists are generated by the Keyword and Phrase extractor 112 when the Recorder 104 records TV programs with CC, the Content Prefetch Agent 116 continually issues search queries for related internet content (e.g., "related video") to the Internet Video Search component 114. Then, for each related video search result, the Content Prefetch Agent 116 checks with the Prefetch Video Database component 117 for pre-fetched identical video that has been downloaded. If the video has not been downloaded and if storage space is still within that specified by the user, the Agent 116 creates a new download task request for a download process pool to download the related video for the programming being recorded.

The Prefetch Video Database module 117 maintains the downloaded related internet content including pre-fetched related videos, etc. The module 117 provides an interface to a repository for the pre-fetched related videos on hard disk 120. The module 117 provides fast access to the related videos based on corresponding keywords, extracted from the recorded programs. The module 117 also maintains the storage limited per channel type by deleting pre-fetched videos that reach storage expiration dates. Example database properties are listed below and Table 1 below shows an example database entry:

Video Id: Unique video id (identification) or link to the original related internet video.
File name: Actual local path file name of the downloaded (pre-fetched) related internet video.
File size: File size of the related internet video.
Prefetch date: Download date and time.
Storage expiration: Deletion date and time.
Keyword: Associated keywords for related internet video query.
Channel types: "Favorite", "Most popular", "Comedy", "Related to", etc.
Recorded TV Program Id: Unique id for the recorded programming based on which the related internet video was found. This id can be used to obtain the EPG information from PVR subsystems.

TABLE 1

| Video Id | File name | File size | Prefetch Date | Storage Expiration | Keyword | Channel type | Recorded TV Program Id |
|---|---|---|---|---|---|---|---|
| http://youtube.com/watch?v=wuxY7nhyXrM | /prefetch_storage/youtube_wuxY7nhyXrM.flv | 368 kb | 2007.10.18 17:35 | 2007.11.18 17:35 | iphone, hacking, news | "favorite" | cable38_20071018_1930 |

The Prefetch Configuration module 119 provides access to actual user prefetch configuration data on the hard disk 120. The module 119 provides a graphical user interface to enable users to configure the prefetch configuration data. The prefetch configuration data includes size specification to different local storage allocations for different types of channels and storage expiration date. Channel types may be defined by favorite channel set for the user or various set of related internet content channels, based on their genres, popularity, or other categories. Example user prefetch configuration data includes:

Maximum storage space: Maximum local storage space to be used for prefetch.
"My Favorite" channel prefetch space: Percent of maximum storage space to be used for My Favorite Channel.
"My Favorite" channel prefetch space expiration: Time to delete video when space is needed.
"Related to [specific category]" prefetch space: Percent of maximum storage space to be used.
"Related to [specific category]" prefetch space expiration: Time to delete video when space is needed.

The system Controller 118 alerts the Content Prefetch Agent 116 when it is time to start prefetching. Every time the system Controller 118 starts to record a scheduled TV program, the Controller 118 checks the user prefetch configuration 119 to determine if prefetching is needed on a specific TV program. Upon altering the Content Prefetch Agent 116, the system Controller 118 provides all the needed information for the prefetch task to the Agent 116. This information may include e.g., start and end time of the TV program to prefetch related content for, corresponding metadata such as EPG, and the object references to other related system components (Recorder, Keyword and Phrase Extractor, Internet Video Search, Prefetched Video Database, etc.).

Figure 2:
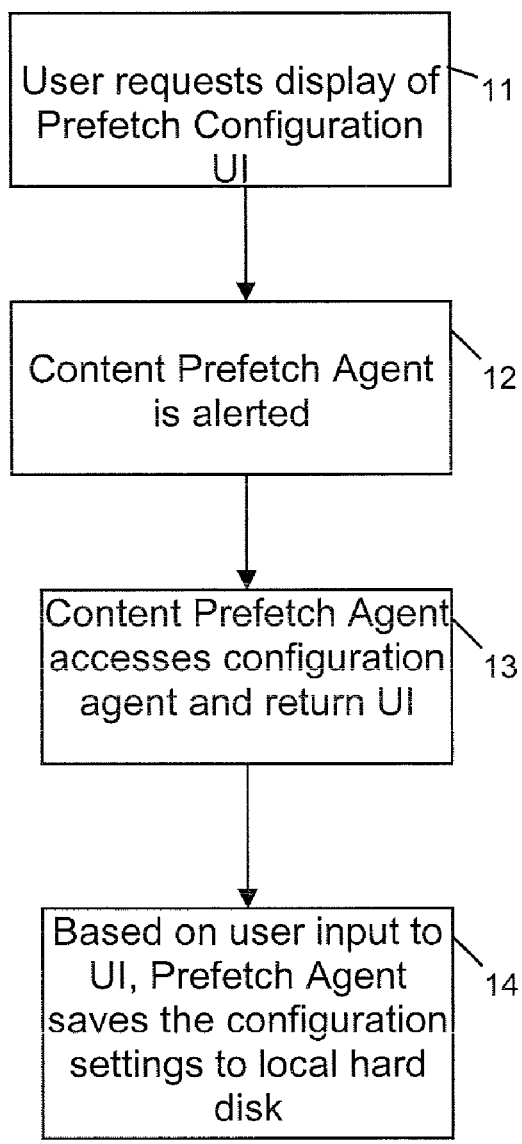
FIG. 2 shows a process for configuring internet content prefetch for video recorders, according to an embodiment of the invention.

FIG. 2 shows an example configuration process 10 implemented by the system 100, including the following blocks 11-14 in conjunction with steps 1-4 in FIG. 1, wherein:

11. User initiates a request to display the prefetch configuration user interface on a TV 103 (step 1 in FIG. 1).
12. The system Controller component 118 handles the request, sending an alert to the Content Prefetch Agent 116 (step 2).
13. The Content Prefetch Agent 116 accesses prefetch configuration data on hard disk 120 to fetch the current configuration (step 3), and returns a prefetch configuration user interface to the system Controller 118.
14. System Controller 118 presents the prefetch user interface to the user on the TV 103 (step 4). User interface includes size specification to different local storage allocations for different types of channels. Channel types may be defined by user's favorite channel set or various set of related internet content channels, based on their genres, popularity, or other categories. Once the settings are saved on the hard disk, the Content Prefetch Agent 116 uses that information for prefetching related internet contents.

Figure 3:
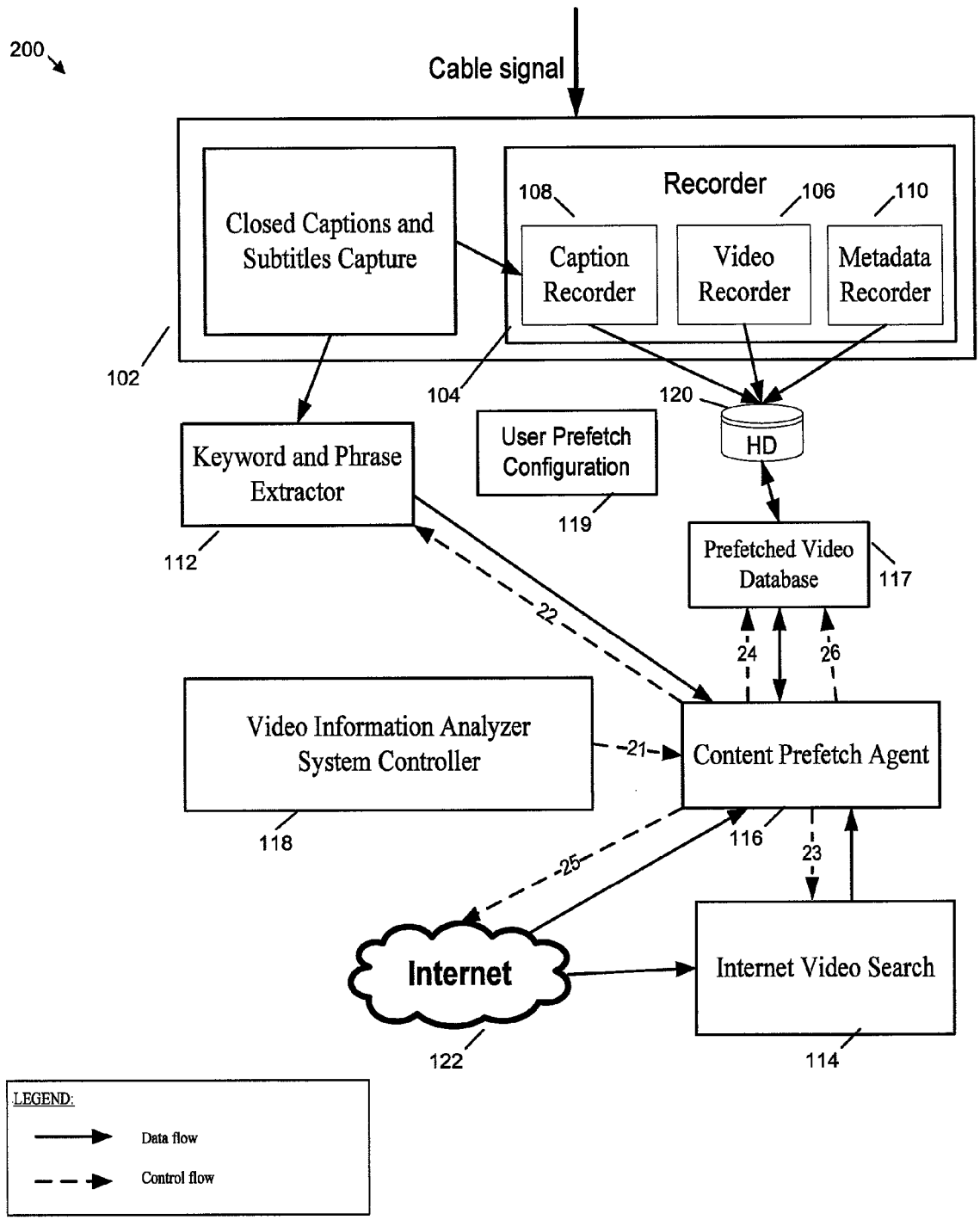
FIG. 3 shows a functional block diagram of a system for prefetching internet content for video recorders, according to another embodiment of the invention.
Figure 4:
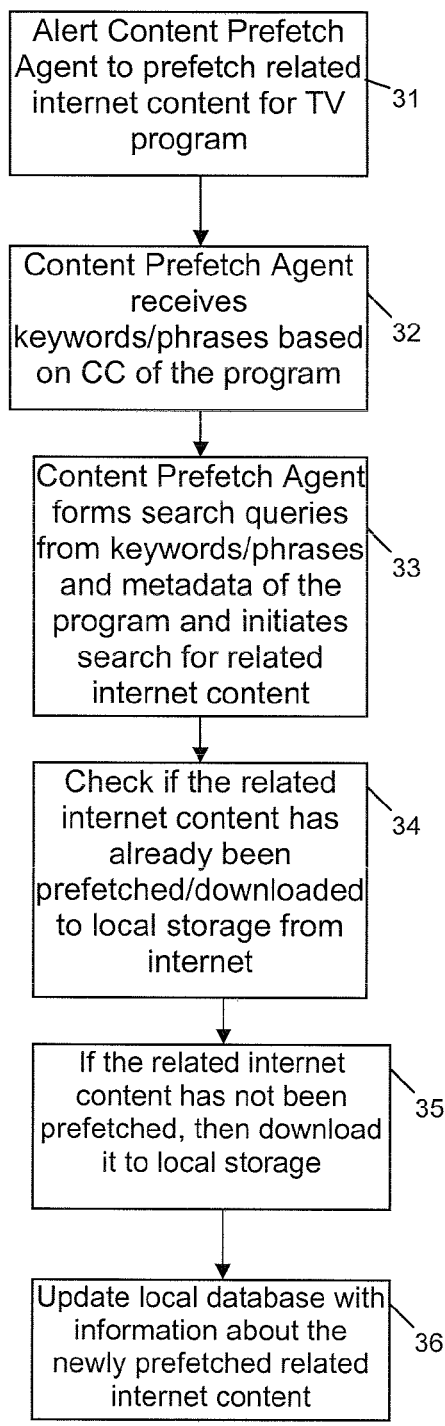
FIG. 4 shows a process for prefetching internet content for video recorders, according to another embodiment of the invention.

FIG. 3 shows a functional block diagram of a system 200 implementing a process 30 (FIG. 4) for prefetching of related internet content for a PVR 101, according to an embodiment of the invention. The process 30 includes the following blocks 31-36 described below in conjunction with the steps 21-26 shown in FIG. 3:

31. The system Controller 118 alerts the Content Prefetch Agent 116 when a prefetch task is needed (step 21). Based on user prefetch configuration, prefetch tasks are usually coupled with scheduled TV program recording tasks. The system Controller 118 also passes EPG information about the TV program scheduled to be recorded to the Content Prefetch Agent 116.
32. The Content Prefetch Agent 116 continually receives keywords/phrases based on CC stream text for TV programs, from the Keyword and Phrase extractor 112 (step 22).
33. Using the EPG information about the TV program being recorded and new keywords/phrases, the Content Prefetch Agent 116 continually compiles search queries to send to the Internet Video Search module 114 for related internet content such as videos (step 23).
34. For each related internet video result found by the Internet Video Search module 114, the Content Prefetch Agent 116 first checks with the Prefetch Video Database 117 to determine if such related internet video has been already downloaded to local storage 120 (step 24).
35. If such related internet video has not been downloaded yet, the Content Prefetch Agent 116 creates a download task and submits it to an internal download process pool to download (prefetch) the related internet video to local storage 120 (step 25).
36. Once a download (prefetch) is complete, the Content Prefetch Agent 116 updates the Prefetch Video Database 117 for the newly downloaded video (step 26). Prefetched videos are saved to pre-allocated local storage in module 120 for better viewing experience.

Using such prefetch techniques on a PVR/STB (set top box) facilitates providing internet content that is related to a recorded program without delay when the user begins viewing the recorded program and desires watching internet content related to the program. The invention provides a feature for PVRs for prefetching Internet-based content (e.g., video) that is related to the recorded TV programs, which is likely of interest to the user. When the user selects the prefeteched related internet content, the content can be played back locally from the local storage without delays associated with internet content viewing directly from the Internet (such as when a video stalls due to slow download speed from the Internet).

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. The current invention satisfies such a need by analyzing a data management policy to identify information necessary for executing the policy, attempting to acquire the determined necessary information from a data backup/protection repository 120, identifying any shortfall in the acquired information, supplementing the acquired information by acquiring the shortfall from a primary data repository, and executing the policy based on the acquired information.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Though the present invention has been described with reference to certain versions thereof; however, other versions are possible. Therefore, the spirit and scope of the appended claims should not be limited to the description of the preferred versions contained herein.

What is claimed is:

1. A method for providing information related to content accessed by a user, comprising
    determining content of interest to the user for access via an electronic device by examining currently recorded content on the electronic device;
    obtaining search information for said content of interest to the user by examining metadata of the currently recorded content, and basing the search information at least partially on the determined content of interest;
    sending a query to a search engine via the Internet, wherein the query is based on the search information, prior to determining content related to said search information;
    prefetching content related to said search information based on results returned from the search engine in response to the query, wherein the prefetching includes downloading the content related to said search information and storing the content related to said search engine it locally prior to the content being explicitly selected by the user;
    upon detecting availability of further search information for said content of interest to the user, sending another query to the search engine via the Internet, wherein the another query is based on the further search information, and prefetching additional content related to said further search information based on results returned from the search engine in response to the another query, wherein the prefetching includes downloading the content related to said search information and storing the content locally; and
    upon access to the content of interest to the user by the user via the electronic device, selectively providing the prefetched content to the user.

2. The method of claim 1, wherein determining content of interest to the user further includes determining content selected by the user to be recorded on a personal video recorder (PVR).

3. The method of claim 2, wherein obtaining search information for said content of interest to the user includes obtaining electronic program guide information for the selected content.

4. The method of claim 3, wherein prefetching content related to said search information includes prefetching information related to the electronic program guide information for the selected content, from at least one selected from a group consisting of external and local sources, electronic program guide information for the selected content.

5. The method of claim 4, wherein pre-fetching additional content includes, upon detecting availability of closed caption information for the selected content, prefetching additional content related to the closed caption information.

6. The method of claim 5, wherein selectively providing the prefetched content includes, upon access to the selected content on the PVR by the user, selectively displaying the prefetched content to the user.

7. The method of claim 1, wherein providing the prefetched content further includes providing the pre-fetched content to the user essentially at the same time as user access to the said content of interest to the user, thereby-wherein latency is reduced in providing related information to the user.

8. The method of claim 1, wherein the prefetched content comprises video content.

9. The method of claim 1, wherein the search information is obtained based on determining keywords from one or more of closed caption information, metadata and electronic program guide (EPG) information.

10. The method of claim 9, wherein the search information is further obtained on determining phrases.

11. The method of claim 8, wherein the video content is obtained over the Internet.

12. The method of claim 9, further comprising:
    initiating a search using the determined keywords; and
    obtaining content of interest to the user over the Internet, wherein the obtained content of interest of the user comprises video content.

13. The method of claim 2, wherein the content of interest to the user comprises video content currently being recorded on the PVR.

14. A system comprising:
    a decoder configured to decode an input video signal into a signal playable by a display, wherein the decoder further includes a metadata capture module configured to capture metadata from the input video signal;
    an interface configured to send the video signal playable by a display to a display;
    a keyword and phrase extractor configured to extract keywords and phrases from the metadata captured by the metadata capture module;
    a local memory;
    a content prefetch agent configured to access an Internet search engine using the extracted keywords and phrases from the metadata to retrieve content related to the input video signal and to store it in the local data store prior to a user actually selecting the content; and
    wherein the interface is further configured to send information related to prefetched content related to the input video signal that has been stored in the local data store to the display.

15. The system of claim 14, wherein the metadata capture module is a closed captions and subtitles capture module.

16. The system of claim 14, wherein the metadata capture module is an electronic program guide object capture module.

17. The system of claim 14, further comprising:
    a user prefetch configuration module configured to accept user input as to settings relating to prefetching preferences and communicate with the content prefetch agent to enact those preferences based on the user.

* * * * *